Dec. 12, 1961 J. J. DONOVAN 3,012,745
TUBING CLIP
Filed Nov. 26, 1957

INVENTOR:
JOHN J. DONOVAN,
BY Walter J. Jones
ATTORNEY.

United States Patent Office 3,012,745
Patented Dec. 12, 1961

3,012,745
TUBING CLIP
John J. Donovan, Medford, Mass., assignor to United-Carr Fastener Corporation, Cambridge, Mass., a corporation of Delaware
Filed Nov. 26, 1957, Ser. No. 698,961
4 Claims. (Cl. 248—71)

This invention relates generally to fastening devices and has particular reference to a fastener for use in retaining wires, tubes, conduit, rods and the like in a set position on a support.

The object of the invention is to provide a fastener capable of firmly holding one or more of the articles mentioned.

A further object of the invention is to provide a versatile fastener capable of holding several different sizes of the articles mentioned.

A still further object of the invention is to provide a fastener which will have a means within itself for self-locking on the articles mentioned when the fastener is attached to a support.

Other objects of the invention will, in part, be obvious and will, in part, appear hereinafter.

In the drawing:

FIG. 1 is an enlarged perspective view of a fastener embodying the features of the invention;

FIG. 2 is a plan view of the fastener of FIG. 1;

FIG. 3 is a view in section taken along line 3—3 of FIG. 2;

FIG. 4 is a view in section along line 4—4 of FIG. 3;

FIG. 5 is a view in elevation of the fastener of FIG. 1 attached to a plate and holding a tube, the plate and tube being shown in section;

FIG. 6 is a plan view, partly in elevation, on line 6—6 of FIG. 5;

FIG. 7 is a view in section on line 7—7 of FIG. 6;

FIG. 8 is a plan view of a modified form of the invention;

FIG. 9 is a view in section taken on line 9—9 of FIG. 8;

FIG. 10 is a view in elevation of the fastener shown in FIG. 8, a tube in section being added;

FIG. 11 is a view in section of the modified form of the invention attached to a plate and holding a tube;

FIG. 12 is a section taken on line 12—12 of FIG. 11.

Referring to the drawing, there is illustrated, in FIGS. 1 through 7, a preferred form of my fastening device comprising a U-shaped clip 10, integral with a support engaging tongue 12 at a terminal end 14 of the clip 10 and a resilient support engaging arm 16, integral with the other terminal end 18 of the clip 10, in generally parallel spaced relation with the tongue 12. The tongue 12 is bent back upon itself and bisected longitudinally on its top portion 17 to form a pair of legs 20. The legs 20 are biased outwardly to form an angle 22 with each other and the outer edges 24 of the legs 20 extend outwardly beyond the edges 26 of the tongue 12. The arm 16 is looped back upon itself to form a rounded support contacting edge 28.

In attaching the fastener to the supporting panel 30, the fastener is first moved into position with the tongue 12 placed into the aperture 32 in the support panel 30 and the contact edge 28 rests against a face 34 of the supporting panel 30. The diameter of the aperture 32 must be smaller than the distance between points a—a on the legs 20 as shown in FIG. 2. As force is exerted on the fastener in the direction of the support panel 30, the edges 24 of the legs 20 frictionally engage a wall 33 at the aperture 32, compressing the legs 20. When the legs 20 have passed through the aperture 32, the compression stresses are released and the legs 20 return to their original position placing the leading edges 36 of the legs 20 into engagement with the support 30 adjacent to the aperture 32 (FIG. 6) located on the side of the support 30 opposite to that engaged by the arm 16. As the legs 20 are compressed, a cantilever action is exerted on the arm 16 in a line parallel with the support 30 and in a direction away from the aperture 32 tightening the clip 10 about a tube 40 or the like. To give added resiliency to the clip 10, an aperture 42, preferably square, may be cut from the inside face 44 of the clip 10 nearest the arm 16. Although I have shown the aperture 42 in my preferred embodiment, highly resilient materials will not require the cutting out of material to obtain the proper action.

Referring now to the modified form of my invention, shown in FIGS. 8-12, there is illustrated a form of the fastener embodying the features of the invention and comprising a U-shaped clip 10a, formed by bending a piece of resilient material into a U shape, integral with the support engaging arms 16a at a terminal end 18a of the clip 10a and an integral support engaging tongue 12a formed from material cut from the inside face 44a of the clip 10a between the arms 16a. The legs 20a are the same as the legs 20 of the preferred embodiment of my invention, except the outer edges 24a of the legs 20a have serrations 46 to engage the sides 34a of the aperture 32a in the supporting panel 30a. The action of this modified form of my invention on engagement is the same as set out for the preferred embodiment except that the serrations 46 can engage the wall 34a at the aperture 32a allowing the clip 10a to undergo varying degrees of compression. The farther the tongue 12a is forced through the aperture 32a, the greater the compression of the clip 10a.

It should be understood that I have shown two specific forms of my improved fastener for holding wires, tubes and the like, but the form of the fasteners may vary as to the snap fastener portion and the portion that holds the wires, tubes or the like. The most important feature of my invention is found in the cooperating action of the arm and the clip to more tightly hold articles placed in the clip. In the modified form of my invention, the use of a means to vary the degree of force applied to the arm 16a is shown, through the use of serrations, however, any number of methods may be used, a spring attachment for example. I have also shown in the modified form that my fastener may be fashioned without looping the material back upon itself, resulting in a saving of material and a simple forming operation.

Since certain other obvious modifications may be made in this device without departing from the scope of the invention, it is intended that all matters contained herein be interpreted in an illustrative and not in a limiting sense.

I claim:

1. A fastening device for attaching a tube, cable or the like to a support comprising a strip of resilient material bent to form a double thickness U-shaped clip, a snap fastening tongue integral with one terminal end of said clip and a resilient support engaging arm integral with the other terminal end of said clip, said tongue and said arm normally in spaced generally parallel relationship and said U-shaped clip having one portion of said strip in relatively close superimposed relationship to another portion of said clip whereby both portions may act to grip a tube, cable or the like.

2. A fastening device for attaching a tube, cable or the like to an apertured support comprising a strip of resilient material bent back upon itself to form a U-shaped clip having a double thickness of said strip throughout the major portion of said clip, said strip having two terminal ends in spaced relation at one side end of said clip, one of said terminal ends formed into a fastening tongue and extending from the outer portion of the clip and the other terminal formed into a resilient support engaging arm extending from the inner portion of the clip, said tongue having means for engaging one side of said support and said resilient support engaging arm having means for making sliding engagement with the opposite side of said support.

3. A fastening device for attaching a tube, cable or the like to a support comprising a strip of resilient material bent to form a U-shaped clip, a tongue integral with one terminal end of said clip having means for engaging said support to hold the fastening device in position and a resilient support engaging arm integral with said clip and normally extending from said clip in substantially the same direction as said tongue.

4. A fastening device for attaching tubes, cables and the like to a support, said fastening device having a clip portion for holding a tube, cable or the like, a snap fastening means extending from said clip portion to attach the fastening device to a support and an independently yieldable support engaging resilient arm means for locking the tube, cable or the like in the clip portion when the fastening device is in attached position upon a support, said resilient arm means having at least a portion thereof normally generally paralleling the snap fastening means and being of a length and shape to engage a support and spring easily toward the clip portion when the snap fastening means is snapped into engagement with a support.

References Cited in the file of this patent
UNITED STATES PATENTS

| | | |
|---|---|---|
| 1,860,861 | Knutson | May 31, 1932 |
| 2,108,347 | Quarnstrom | Feb. 15, 1938 |
| 2,128,005 | Lombard | Aug. 23, 1938 |
| 2,746,112 | Simon | May 22, 1956 |

FOREIGN PATENTS

| | | |
|---|---|---|
| 720,883 | Great Britain | Dec. 29, 1954 |